United States Patent
Kamio (10) Patent No.: US 11,242,900 B2
(45) Date of Patent: Feb. 8, 2022

(54) CLUTCH CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/162,699

(22) Filed: Jan. 29, 2021

(65) Prior Publication Data

US 2021/0148418 A1 May 20, 2021

Related U.S. Application Data (63) Continuation of application No. PCT/JP2019/030899, filed on Aug. 6, 2019.

(30) Foreign Application Priority Data

Aug. 8, 2018 (JP) .............................. JP2018-149280

(51) Int. Cl.
  *F16D 48/06* (2006.01)
  *F16D 11/14* (2006.01)

(52) U.S. Cl.
  CPC .............. *F16D 48/06* (2013.01); *F16D 11/14* (2013.01); *F16D 2500/102* (2013.01); *F16D 2500/3024* (2013.01); *F16D 2500/30415* (2013.01); *F16D 2500/30426* (2013.01)

(58) Field of Classification Search
  CPC .... F16D 48/06; F16D 11/14; F16D 2500/102; F16D 2500/3024; F16D 2500/30415; F16D 2500/30426; F16D 2500/10462; F16D 2500/10412; F16D 2500/7041; F16D 48/064; B60W 2710/025; B60W 10/02;

(Continued)

(56) References Cited

U.S. PATENT DOCUMENTS 10,122,247 B2 * 11/2018 Hattori .................... H02K 11/30
10,859,140 B2 * 12/2020 Hall ....................... F16H 63/304
(Continued)

FOREIGN PATENT DOCUMENTS

JP  2006-38136   2/2006
JP  2018-39317   3/2018

OTHER PUBLICATIONS

U.S. Appl. No. 17/162,651, to KAMIO, entitled "Clutch Control Device", filed Jan. 29, 2021 (40 pages).

*Primary Examiner* — David J Hlavka
(74) *Attorney, Agent, or Firm* — Nixon & Vanderhye P.C.

(57) ABSTRACT

A first engagement member includes a first meshing portion and rotates integrally with a first shaft. A second engagement member includes a second meshing portion configured to mesh with the first meshing portion and rotates integrally with a second shaft. An electric clutch device drives the first engagement member via a pressing member that extends and contracts in response to drive of a clutch actuator. When the electric clutch device is to be engaged, the first shaft command computation unit sets the first shaft rotation speed command value to be smaller than the rotation speed of the second shaft. Further, after the rotation speed of the first shaft matches the first shaft rotation speed command value, the first shaft command computation unit sets the first shaft rotation speed command value to be gradually closer to the rotation speed of the second shaft.

5 Claims, 8 Drawing Sheets

(58) Field of Classification Search
CPC ... B60K 6/48; B60K 2006/4825; B60K 6/387
See application file for complete search history.

(56) References Cited

U.S. PATENT DOCUMENTS

2015/0354494 A1* 12/2015 Furukawa ................. F01L 1/26
123/193.5
2017/0248229 A1 8/2017 Nakayama

* cited by examiner

CLUTCH CONTROL DEVICE

CROSS REFERENCE TO RELATED APPLICATION

The present application is a continuation application of International Patent Application No. PCT/JP2019/030899 filed on Aug. 6, 2019, which designated the U.S. and claims the benefit of priority from Japanese Patent Application No. 2018-149280 filed on Aug. 8, 2018. The entire disclosures of all of the above applications are incorporated herein by reference.

TECHNICAL FIELD

The present disclosure relates to a clutch control device.

BACKGROUND

Conventionally, a clutch device is provided between a drive motor and an engine or between the drive motor and drive wheels in a vehicle.

SUMMARY

According to an aspect of the present disclosure, a clutch control device is for an electric clutch device that includes: a first engagement member that includes a first meshing portion and configured to rotate integrally with a first shaft; a second engagement member that includes a second meshing portion configured to mesh with the first meshing portion and that is configured to rotate integrally with a second shaft; and a clutch actuator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, examples of the present disclosure will be described.

According to an example of the present disclosure, a clutch is provided between a drive motor and an engine or between the drive motor and drive wheels in, for example, a hybrid vehicle. The clutch is configured to switch between an engaged state and a release state.

According to an example of the present disclosure, a hydraulic clutch is provided between an engine and a drive motor and between the drive motor and a transmission. In this example, a clutch engaging force is generated with a hydraulic pressure. Therefore, in order to generate a thrust force, a hydraulic loss occurs.

According to an example of the present disclosure, a clutch control device controls an engagement state of an electric clutch device. The electric clutch device includes a first engagement member, a second engagement member, and a clutch actuator. The first engagement member includes a first meshing portion and rotates integrally with a first shaft. The second engagement member includes a second meshing portion that is configured to mesh with the first meshing portion and rotates integrally with a second shaft. The electric clutch device drives the first engagement member via the pressing member that extends and contracts in response to drive of the clutch actuator.

According to an example of the present disclosure, a clutch control device includes a first shaft command computation unit and a drive control unit. The first shaft command computation unit computes a first shaft rotation speed command value related to a rotation speed of the first shaft. The drive control unit controls drive of the clutch actuator. When the electric clutch device is to be engaged, the first shaft command computation unit sets the first shaft rotation speed command value to be smaller than the rotation speed of the second shaft. Further, after the rotation speed of the first shaft matches the first shaft rotation speed command value, the first shaft command computation unit sets the first shaft rotation speed command value to be gradually closer to the rotation speed of the second shaft.

The configuration does not use hydraulic pressure to engage the electric clutch device. Therefore, the configuration enables to reduce a hydraulic loss as compared with a configuration in which a clutch thrust is producing by using the hydraulic pressure. In addition, the configuration enables to engage the meshing type electric clutch device appropriately.

Embodiment

Figure 1:
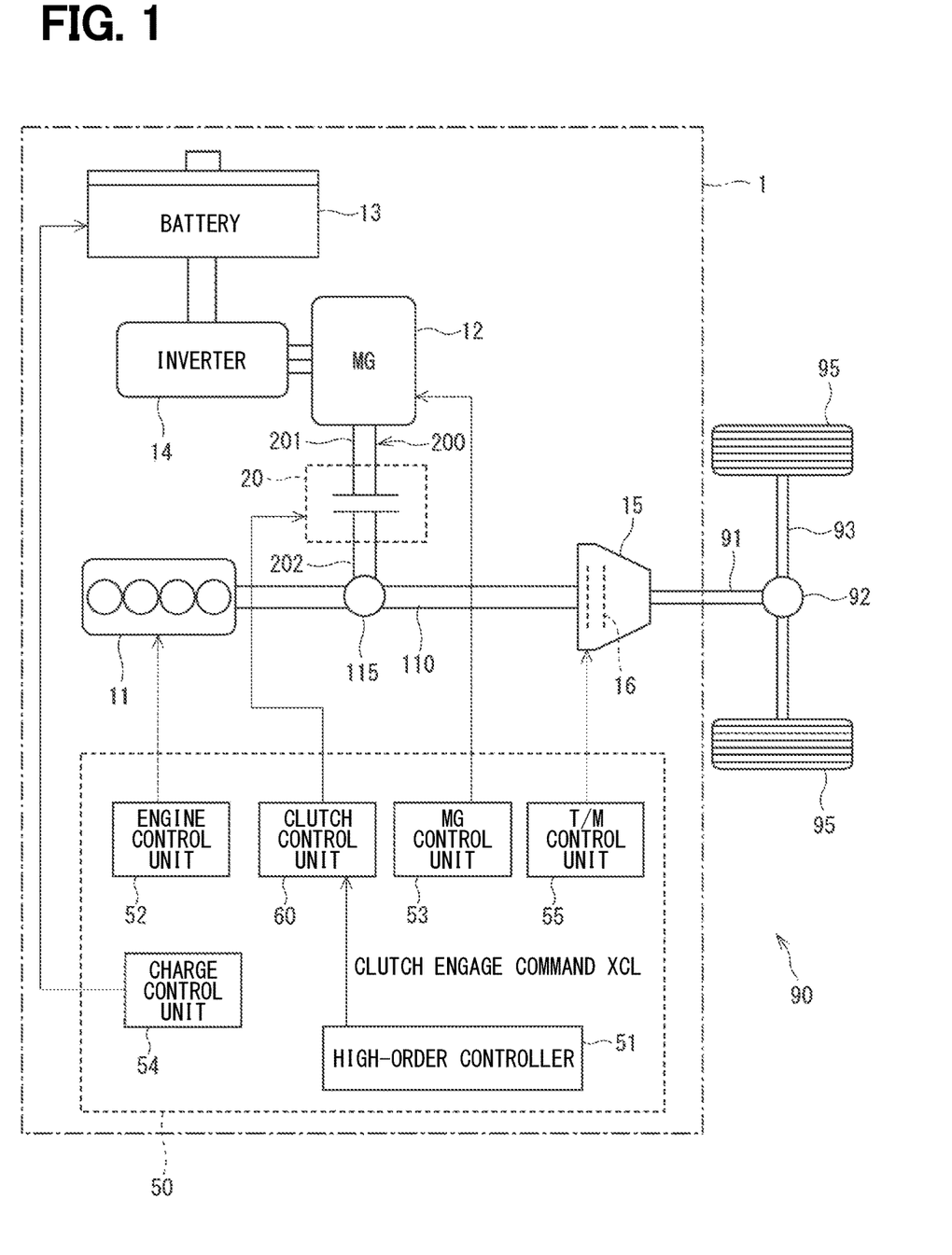
FIG. 1 is a schematic configuration diagram showing a vehicle drive system according to an embodiment.

Hereinafter, a clutch control device according to the present disclosure will be described with reference to the drawings. FIGS. 1 to 9 show a clutch control device according to an embodiment. As shown in FIG. 1, a control device 50 as the clutch control device is applied to a vehicle drive system 1. The vehicle drive system 1 includes an engine 11, a main motor 12, a battery 13, an inverter 14, a transmission 15, an electric clutch device 20, and the control device 50 and the like. The vehicle drive system 1 is mounted on a vehicle 90. The vehicle 90 of the present embodiment is a so-called hybrid vehicle including the engine 11 and the main motor 12 as a drive source.

Drive wheels 95, which correspond to a driven object, are connected to an axle 93. The axle 93 is connected to a drive shaft 91, to which a driving force of the engine 11 and the main motor 12 is output, via a gear 92. In this configuration, the driving force of the engine 11 and the main motor 12 is transmitted to the drive wheels 95 via the drive shaft 91, the gear 92, the axle 93, and the like, thereby to rotationally drive the drive wheels 95. The engine 11 is an internal combustion engine having multiple cylinders.

The main motor 12 is a so-called "motor generator." The main motor 12 has a function of an electric motor that generates torque by being driven by electric power from the battery 13 and a function of a generator that is driven by the engine 11 or driven when the vehicle 90 is decelerated to generate electricity. The main motor 12 is denoted as "MG" as appropriate in the drawings. The main motor 12 of the present embodiment is a permanent magnet-type synchronous three-phase AC rotary machine. An output shaft 200 of the main motor 12 is connected to an output shaft 110 of the engine 11 via a gear 115.

The battery 13 is a DC power source including a rechargeable secondary battery such as a nickel hydrogen battery or a lithium ion battery. The battery 13 is a DC power source including a rechargeable secondary battery such as a nickel hydrogen battery or a lithium ion battery. Instead of the battery 13, a power storage device such as an electric double layer capacitor may be used as the DC power source.

The inverter 14 is provided between the main motor 12 and the battery 13. The inverter 14 converts a DC power of the battery 13 into an alternating current and supplies the alternating current to the main motor 12. Further, The inverter 14 converts the AC power generated by using the main motor 12 into a DC power and supplies the DC power to the battery 13.

The transmission 15 is provided between the gear 115 and the drive shaft 91. The transmission 15 changes rotation of the drive source, which is the engine 11 and MG12, and transmits the rotation to the drive shaft 91. The transmission 15 is, for example, a hydraulic continuously variable transmission (CVT). It is noted that, a multi-speed transmission may be used for the transmission 15. The transmission 15 includes a built-in clutch 16.

Figure 2:
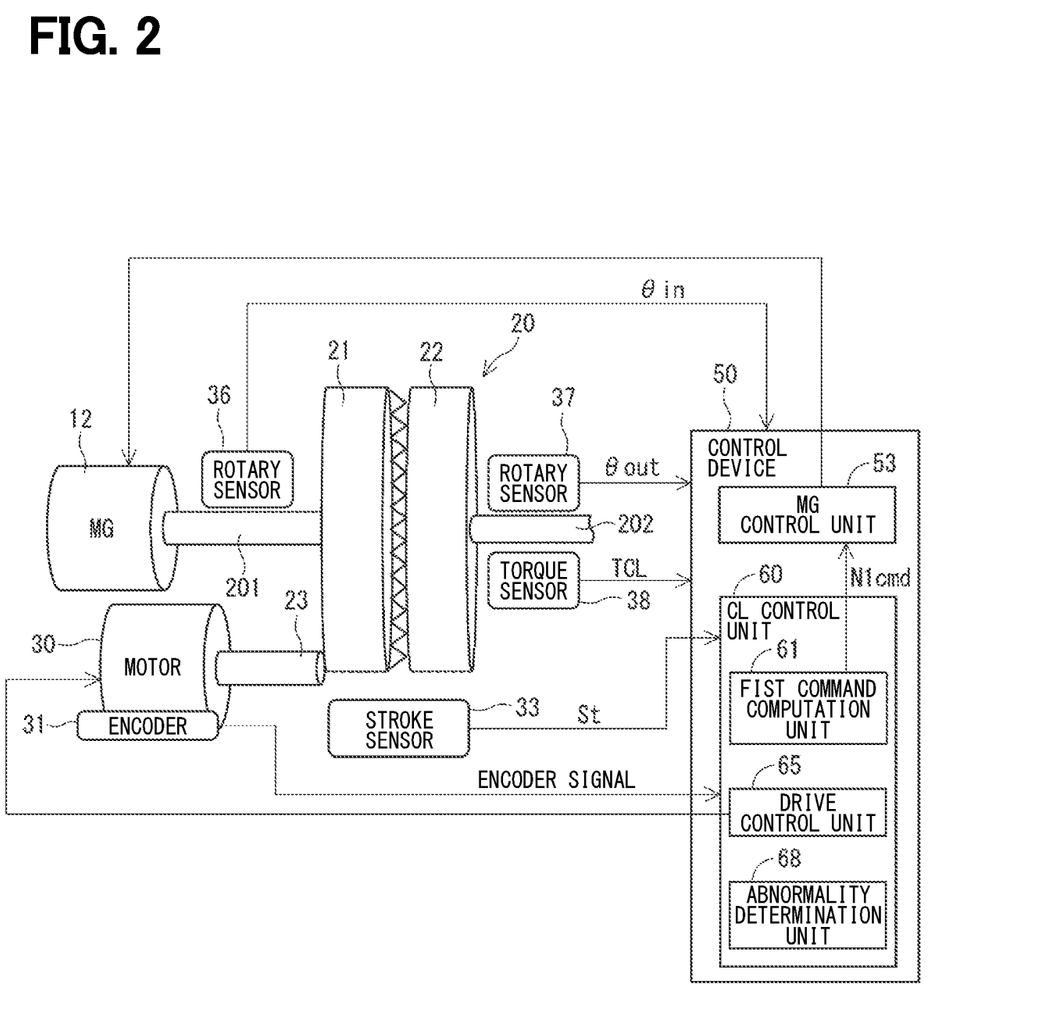
FIG. 2 is a schematic configuration diagram showing an electric clutch device according to the embodiment.

The electric clutch device 20 is provided to the output shaft 200 of the main motor 12. In the present embodiment, the rotation shaft of the electric clutch device 20 on the side of the main motor 12 is a first shaft 201, and the rotation shaft of the electric clutch device 20 on the side of the gear 115 side is a second shaft 202. The electric clutch device 20 is engaged, when, for example, the vehicle speed is a predetermined speed (for example, 80 [km/h]) or less, thereby to cause to travel with the driving force of the main motor 12 or with the driving force of the main motor 12 and the engine 11. The electric clutch device 20 is released when the vehicle speed is higher than the predetermined speed and cause to travel with the driving force of the engine 11. As shown in FIG. 2, the electric clutch device 20 includes engagement members 21 and 22 and a motor 30 which is a clutch actuator. The first engagement member 21 rotates integrally with the first shaft 201, and the second engagement member 22 rotates integrally with the second shaft 202. In the present embodiment, a first shaft rotation speed N1, which is a rotation speed of the first shaft 201, is a rotation speed of the main motor 12, and a second shaft rotation speed N2, which is a rotation speed of the second shaft 202, is a value obtained by converting the rotation speed of the engine 11 with a gear ratio of the gear 115. The first shaft rotation speed N1 may also be a value converted by using a gear ratio or the like.

Figure 3:
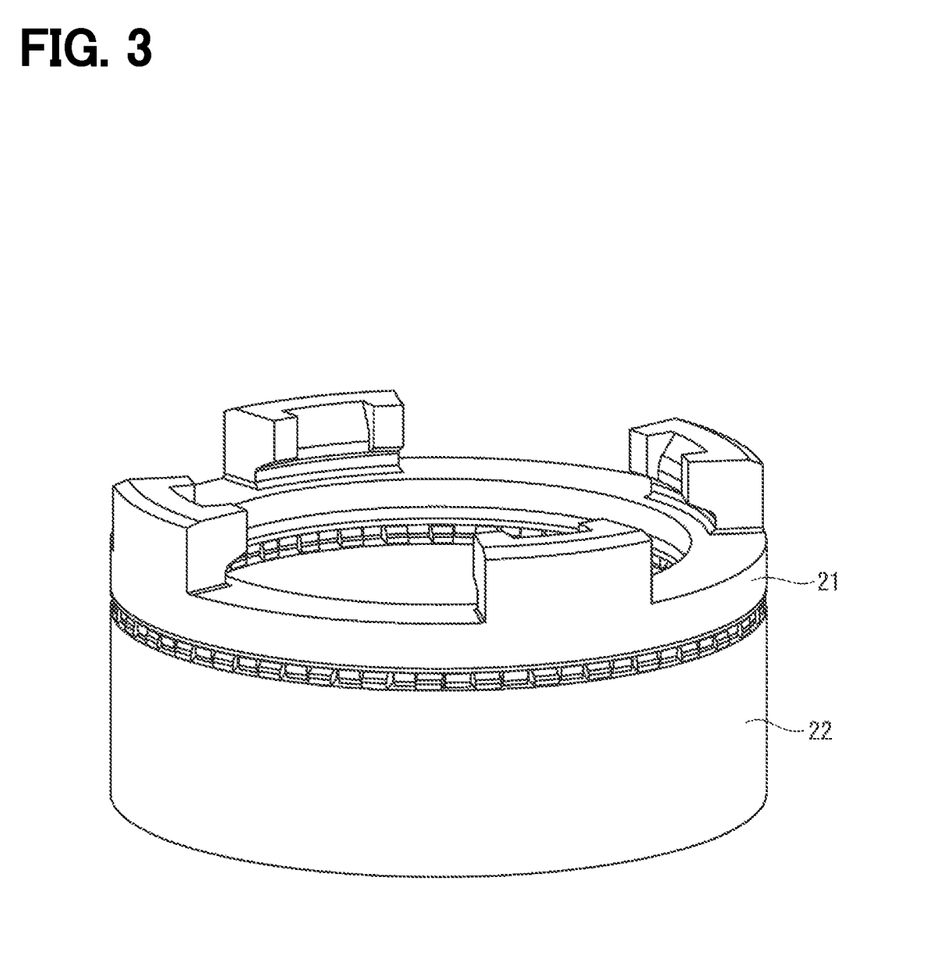
FIG. 3 is a perspective view showing a first engagement member and a second engagement member according to the embodiment.
Figure 4:
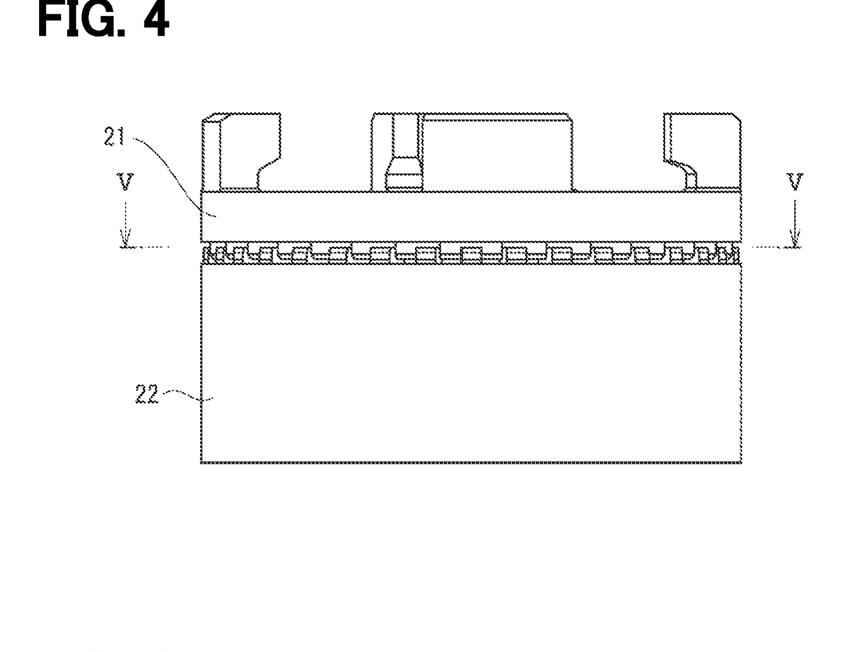
FIG. 4 is a sideview showing the first engagement member and the second engagement member according to the embodiment.
Figure 5:
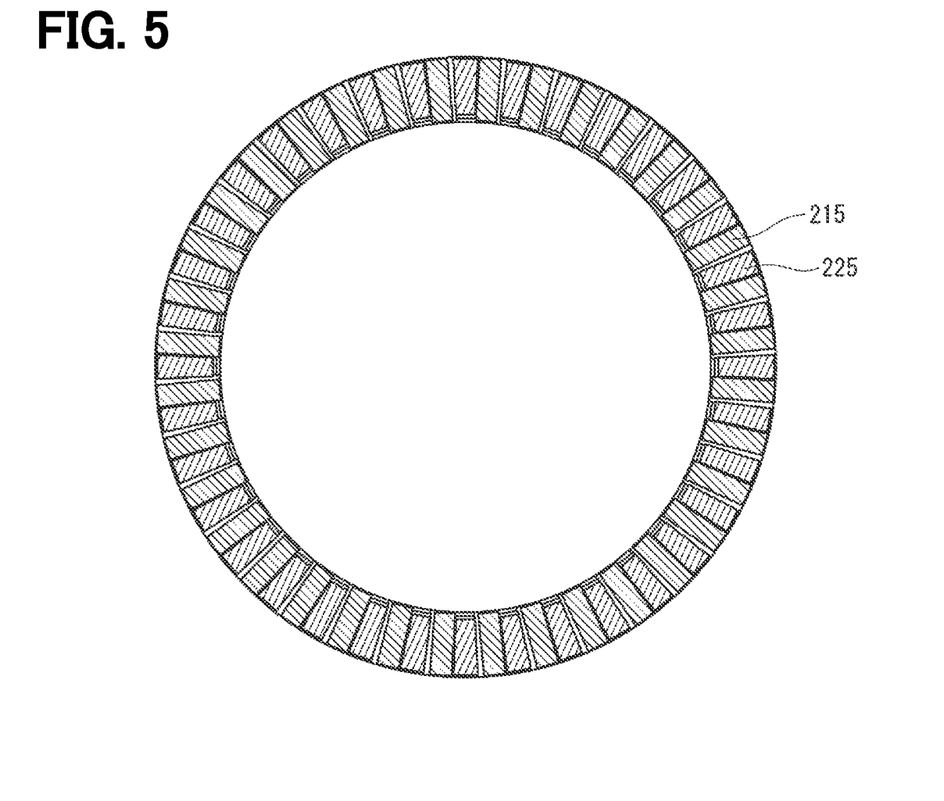
FIG. 5 is a cross sectional view taken along a line V-V of FIG. 4.

As shown in FIGS. 3, 4 and 5, the first engagement member 21 is formed with a first meshing portion 215 on the surface facing the second engagement member 22. The second engagement member 22 is formed with a second meshing portion 225 on a surface facing the first engagement member 21. The electric clutch device 20 of the present embodiment is a dog clutch that is engaged by engaging the meshing portions 215 and 225 with each other. When the first meshing portion 215 and the second meshing portion 225 are engaged with each other, the first shaft 201 and the second shaft 202 rotate integrally.

As shown in FIG. 2, a pressing member 23 is fed by the motor 30 that rotates in the forward direction, thereby to drive the first engagement member 21 toward the second engagement member 22. Further, by rotating the motor 30 in the opposite direction, the first engagement member 21 is driven to the side away from the second engagement member 22.

The motor 30 is a permanent magnet type DC brushless motor, and an encoder 31 is built in. The encoder 31 is, for example, a magnetic rotary encoder and is made up of a magnet that is configured to rotate integrally with the rotor, a magnetic detection hall integrated circuit (IC), and the like. The encoder 31 outputs an encoder signal which is an A phase and B phase pulse signal at predetermined angles in synchronization with the rotation of the rotor to a clutch control unit 60.

A stroke sensor 33 detects a stroke amount St of the first engagement member 21. The stroke amount St can be converted from the encoder count value $\theta en$. Therefore, the stroke sensor 33 may be omitted. A first rotation angle sensor 36 detects the rotation angle $\theta in$ of the first shaft 201, and a second rotation angle sensor 37 detects the rotation angle $\theta out$ of the second shaft 202. A torque sensor 38 detects the engagement torque TCL of the electric clutch device 20.

As shown in FIG. 1, the control device 50 includes a high-order control unit 51, an engine control unit 52, an MG control unit 53, a charge control unit 54, a transmission control unit 55, and the clutch control unit 60. In the drawing, the transmission control unit is described as "T/M control unit". Each of the control units 51 to 55 and the clutch control unit 60 mainly includes a microcomputer and the like, and internally includes, although not shown in the drawing, a CPU, a ROM, a RAM, an I/O, a bus line interconnecting these components, and the like. Processing executed by each of the control units may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit. The control units 51 to 55 and the clutch control unit 60 are provided to enable communication with each other via, for example, CAN (Controller Area Network).

The high-order control unit 51 controls entirety of the vehicle drive system 1 and sets a drive mode in which fuel efficiency is optimized. The drive mode includes an MG drive mode, in which the vehicle travels with the driving force of the main motor 12, a hybrid mode, in which the vehicle runs with the driving force of the engine 11 and the driving force of the main motor 12, an engine running mode, in which the vehicle runs with the driving force of the engine 11, and a charging mode, in which the main motor 12 is driven by the driving force of the engine 11 to generate electricity and in which the battery 13 is charged.

The high-order control unit 51 outputs control requests according to the drive mode as being set and the like to the engine control unit 52, the MG control unit 53, the charge control unit 54, the transmission control unit 55, and the clutch control unit 60, respectively. Further, the high-order control unit 51 outputs a clutch engagement command XCL to the clutch control unit 60.

The engine control unit 52 controls the drive of the engine 11. The MG control unit 53 controls the drive of the main motor 12. The charge control unit 54 controls the charge amount of the battery 13 such that an SOC of the battery 13 is within a predetermined range. The transmission control unit 55 controls an oil pressure and the like applied to the transmission 15. It is noted that, the MG control unit 53 and the charge control unit 54, in reality, control the drive of the inverter 14 or the drive of the engine 11, however, some control lines are omitted in order to avoid complication.

The clutch control unit 60 controls drive of the motor 30 in response to the clutch engagement command XCL acquired from the high-order control unit 51, thereby to control the engagement state of the electric clutch device 20. As shown in FIG. 2, the clutch control unit 60 includes a first shaft command computation unit 61, a drive control unit 65, an abnormality determination unit 68 that determines an abnormality of the electric clutch device 20, and the like.

The first shaft command computation unit 61 computes a first shaft rotation speed command value N1cmd when engaging the electric clutch device 20 and outputs it to the MG control unit 53. The drive control unit 65 is configured to control drive of the motor 30 such that the encoder count value θen becomes a target count value θcmd. The encoder count value θen is computed based on the A-phase and B-phase pulse signals output from the encoder 31. The encoder count value θen is a value corresponding to the actual mechanical angle and the electric angle of the motor 30, and in the present embodiment, the encoder count value θen is defined as a "motor angle".

The encoder count value θen is a value that can be converted into a drive amount from the initial position of the first engagement member 21. In this embodiment, the encoder count value θen when the first engagement member 21 is in the initial position is 80, the encoder count value θen when the engagement members 21 and 22 are in contact with each other is θc, and the encoder count value θen when the meshing portions 215 and 225 are completely meshed with each other is θkam. That is, when the encoder count value θen is smaller than θc, the engagement members 21 and 22 are separated from each other, and when the encoder count value θen is θkam, the engagement members 21 and 22 are completely engaged with each other. Hereinafter, the encoder count value θen will be described as the position of the first engagement member 21 as appropriate.

The electric clutch device 20 of this embodiment is a dog clutch. Therefore, the electric clutch device 20 can be engaged by setting the meshing portions 215 and 225 at a meshable phase in a state where the pressing force for pressing the first engagement member 21 toward the second engagement member 22 is acting. Further, even when the pressing force is acting, the first engagement member 21 is repelled when the meshing portions 215 and 225 are in a phase in which the meshing portions 215 and 225 cannot mesh with each other.

A clutch engagement process of this embodiment will be described with reference to the flowchart of FIG. 6. This process is executed at a predetermined cycle when the electric clutch device 20 is engaged. A computation cycle T is longer than a control cycle of the command correction process described later and is set to, for example, 0.5 [s]. Hereinafter, "step" in step S101 is omitted, and is simply referred to as a symbol "S". The same applies to the other steps. Herein, the process performed by the clutch control unit 60 will be described. It is noted that, at least a part of the process may be executed by another control unit of the control device 50. The same applies to the command correction process.

In S101, the clutch control unit 60 determines whether or not the clutch engagement command XCL has been switched from off to on. When the on state of the clutch engagement command XCL is continued (S101: NO), the process proceeds to S103. When the clutch engagement command XCL is switched from off to on (S101: YES), the process proceeds to S102.

In S102, the first shaft command computation unit 61 computes the first shaft rotation speed command value N1cmd, which is the command value of the first shaft rotation speed N1 (see equation (1)). The first shaft rotation speed command value N1cmd is set to a value that is smaller than the current second shaft rotation speed N2 by a predetermined value α. The second shaft rotation speed N2 is a value based on the detection value of the second rotation angle sensor 37 and the like. The second shaft rotation speed N2 may be acquired from the engine control unit 52. The predetermined value α is set to an appropriate value, such that the first shaft rotation speed N1 and the second shaft rotation speed N2 are relatively close to each other so that the meshing portions 215 and 225 are enabled to mesh with each other, and such that the phases of the meshing portions 215 and 225 are to be deviated from each other due to the difference in rotational speed between the first shaft 201 and the second shaft 202. The set first shaft rotation speed command value N1cmd is transmitted to the MG control unit 53. The MG control unit 53 controls drive of the main motor 12 such that the first shaft rotation speed N1 becomes the first shaft rotation speed command value N1cmd.

$$N1cmd = N2 - \alpha \tag{1}$$

In S103, the clutch control unit 63 determines whether or not the first shaft rotation speed N1 matches the first shaft rotation speed command value N1cmd. In the present embodiment, when the first shaft rotation speed N1 is within a predetermined range including the first shaft rotation speed command value N1cmd, it is determined that the first shaft rotation speed N1 matches the first shaft rotation speed command value N1cmd. When it is determined that the first shaft rotation speed N1 does not match the first shaft rotation speed command value N1cmd (S103: NO), the control of the main motor at the first shaft rotation speed command value N1cmd set in S102 is continued. When it is determined that the first shaft rotation speed N1 matches the first shaft rotation speed command value N1cmd (S103: YES), the process proceeds to S104. Explanation will be made on assumption that, after the first shaft rotation speed N1 matches the first shaft rotation speed command value N1cmd at the time of the clutch engagement control, the first shaft rotation speed N1 follows the first shaft rotation speed command value N1cmd, and the state in which the first shaft rotation speed N1 matches the first shaft rotation speed command value N1cmd is continued.

In S104, the clutch control unit 60 determines whether or not engagement of the electric clutch device 20 has completed. Herein, when the encoder count value θen reaches the completely meshed position θkam, it is determined that the engagement is completed. When it is determined that the engagement of the electric clutch device 20 is completed (S104: YES), the process proceeds to S113 where an engagement completion flag XCLend is set, and the count value CT of a repeat counter is reset. As follows, as appropriate, a state, in which a flag is set, is set to "1", and a state, in which the flag is not set, is set to "0". The engagement completion flag XCLend is reset when the clutch engagement command XCL is turned off. When it is determined that the engagement of the electric clutch device 20 is not completed (S104: NO), the process proceeds to S105.

In S105, the clutch control unit 60 determines whether or not the count value CT of the repeat counter is 0. When it is determined that the count value CT of the repeat counter is 0 (S105: YES), the process of S106 is not executed, and the process proceeds to S107. When it is determined that the count value CT of the repeat counter is not 0 (S105: NO), the process proceeds to S106 where the first shaft rotation speed command value N1cmd is gradually increased (see equation (2)). B in the equation is an appropriately predetermined value that is smaller than $\alpha$. Further, (h−1) in the equation represents the previous value, and (h) represents the current value. In this way, the first shaft rotation speed N1 gradually approaches the second shaft rotation speed N2. The process of S105 may be omitted, and the first shaft rotation speed command value N1cmd may be gradually increased immediately after the first shaft rotation speed N1 matches the first shaft rotation speed command value N1cmd. Further, in the present embodiment, the first shaft rotation speed command value N1cmd is stepwisely approached for each computation cycle of the clutch control process. It is noted that, the first shaft rotation speed command value N1cmd may be gradually approached to the second shaft rotation speed N2 in various ways.

$$N1cmd(h)=N1cmd(h-1)+\beta \qquad (2)$$

In S107, the clutch control unit 60 determines whether or not the count value CT of the repeat counter is larger than an abnormality determination threshold value TH. The abnormality determination threshold value TH is set to an appropriate value (for example, 5). When it is determined that the count value CT of the repeat counter is larger than the abnormality determination threshold value TH (S107: YES), the process proceeds to S112 where it is determined that an abnormality in which the electric clutch device 20 cannot be engaged has occurred. Further, the information indicating that an abnormality has occurred in the electric clutch device 20 is notified to the high-order control unit 51, and a fail-safe control is started. When it is determined that the count value CT of the repeat counter is equal to or less than the abnormality determination threshold value TH (S107: NO), the process proceeds to S108.

In S108, the clutch control unit 60 determines whether or not the count value CT of the repeat counter is an even number. Herein, a case where CT=0 is regarded as an even number. When it is determined that the count value CT is an even number (S108: YES), the process proceeds to S109. When it is determined that the count value CT is an odd number (S108: NO), the process proceeds to S110.

In S109, the clutch control unit 60 sets a torque-up request flag XCLup and resets a torque-down request flag XCLdown. In S110, the clutch control unit 60 resets the torque-up request flag XCLup and sets the torque-down request flag XCLdown. It is noted that, the processes of S109 and S110 may be exchanged such that the torque is increased when the count value CT is an odd number, and the torque is decreased when the count value CT is an even number. In S111, the clutch control unit 60 increments the count value CT of the repeat counter.

The command correction process according to the present embodiment will be described with reference to a flowchart of FIG. 17. This process is executed at a predetermined cycle when the electric clutch device 20 is engaged. The computation cycle is shorter than the computation cycle of the clutch engagement process in FIG. 6 and is set to, for example, 8 [ms]. In S201, the clutch control unit 60 determines whether or not the clutch engagement command XCL is on. When it is determined that the clutch engagement command XCL is off (S201: NO), the command correction process is not executed. That is, when the electric clutch device 20 is switched from the engaged state to the released state, the motor 30 may be rotated in the reverse direction to return the first engagement member 21 to the initial position without executing the command correction process. When it is determined that the clutch engagement command XCL is ON (S201: YES), the process proceeds to S202.

In S202, the clutch control unit 60 determines whether or not the engagement completion flag XCLend is set. When it is determined that the engagement completion flag XCLend is set (S202: YES), this routine is terminated without executing the following processing. When it is determined that the engagement completion flag is not set (S202: NO), the process proceeds to S203.

Figure 6:
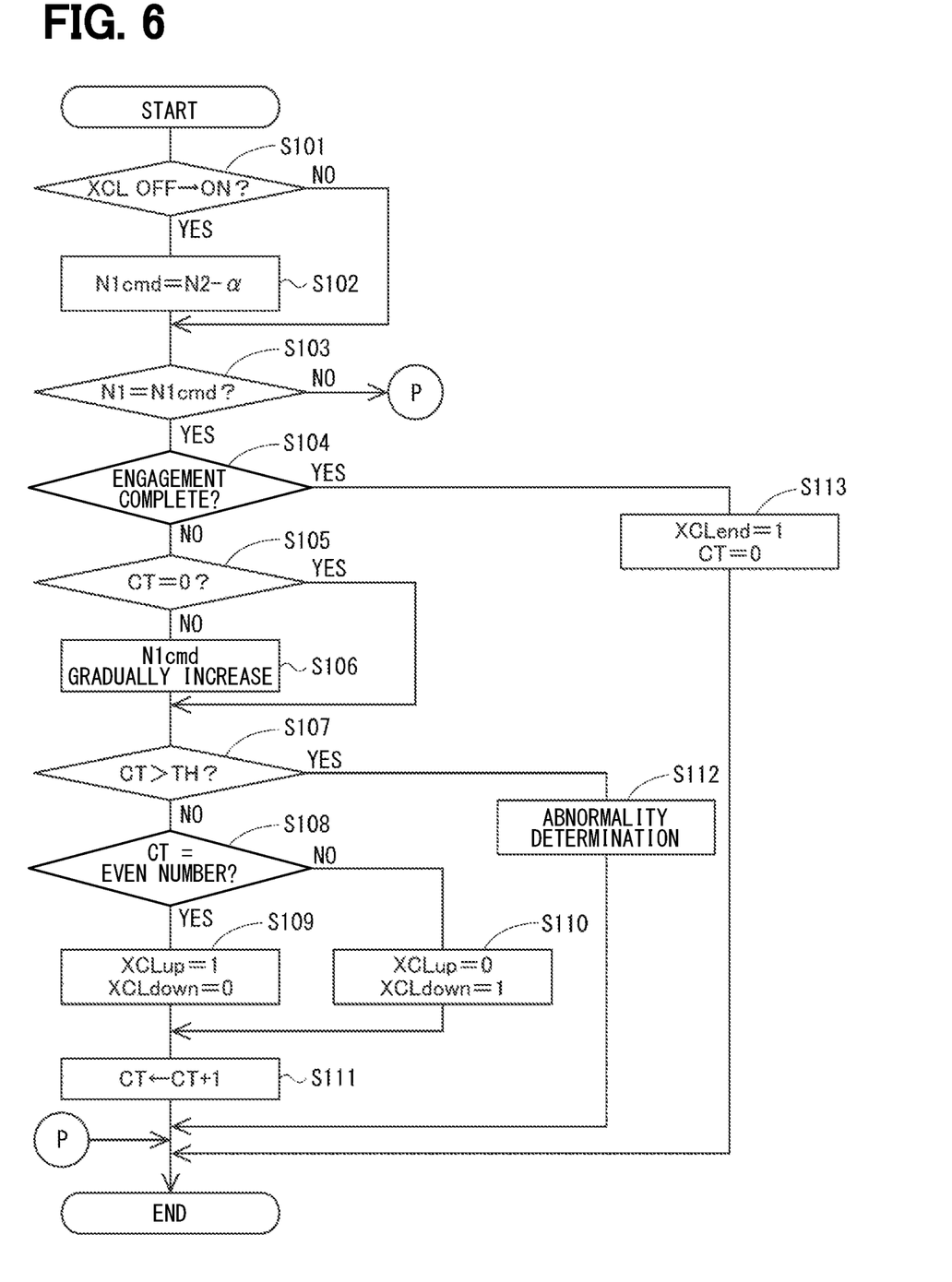
FIG. 6 is a flowchart showing a clutch engagement process according to the embodiment.
Figure 7:
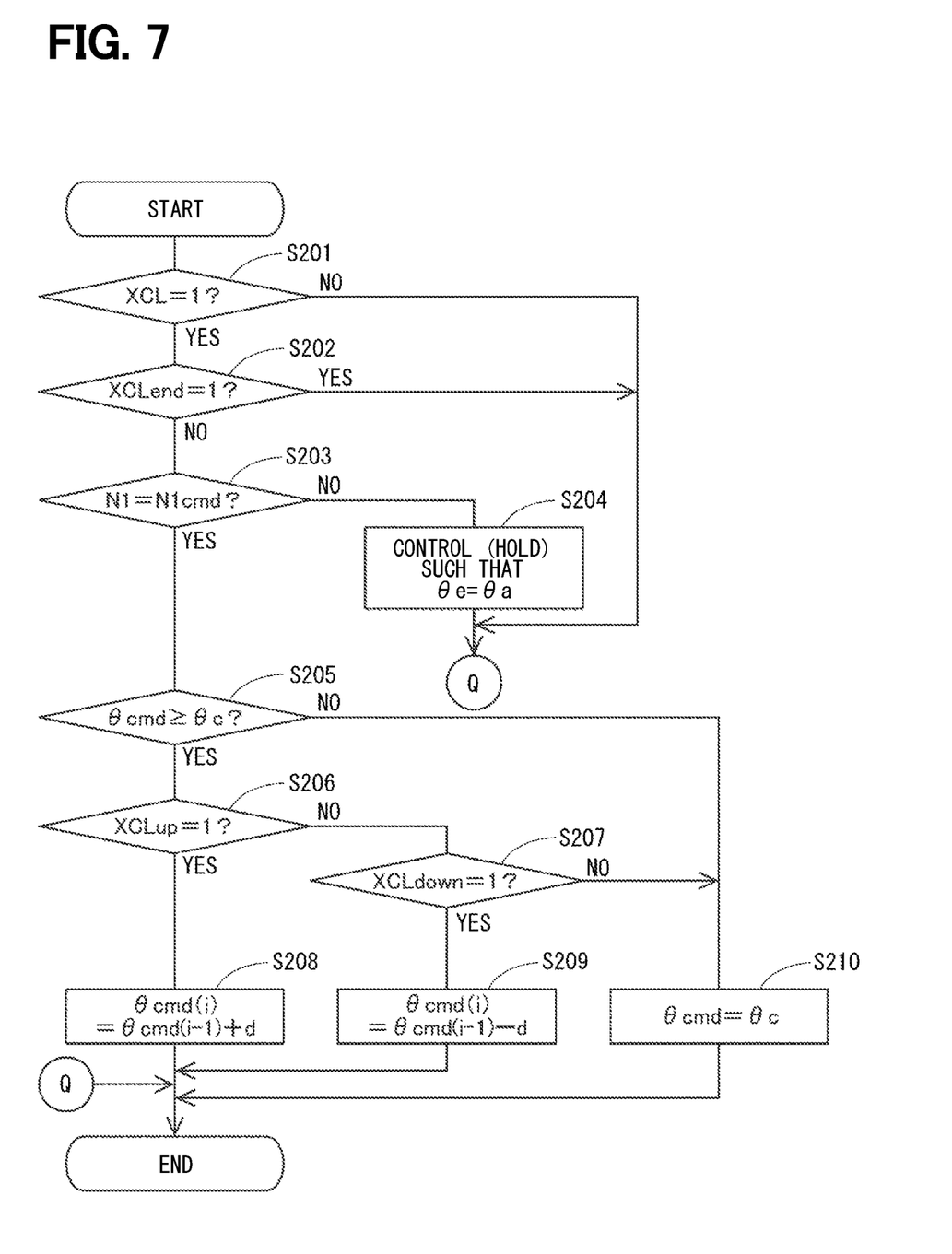
FIG. 7 is a flowchart showing a command correction process according to the embodiment.

In S203, the clutch control unit 60 determines whether or not the first shaft rotation speed N1, which is the rotation speed of the first shaft 201, matches the first shaft rotation speed command value N1cmd, similarly to S103 in FIG. 6. When it is determined that the first shaft rotation speed N1 matches the first shaft rotation speed command value N1cmd (S203: YES), the process proceeds to S205. When it is determined that the first shaft rotation speed N1 does not match the first shaft rotation speed command value N1cmd (S203: NO), the process proceeds to S204.

In S204, the clutch control unit 60 controls drive of the motor 30 such that the encoder count value θen becomes a before-engagement position θa. When the encoder count value θen is the before-engagement position θa, that state is maintained. The before-engagement position θa is set to be a position that is before the contact position θc, which is the encoder count value when the first engagement member 21 and the second engagement member 22 are in contact with each other, by a predetermined value γ (see equation (3)). The predetermined value γ is set to a value, such that the engagement members 21 and 22 approach each other relatively, and such that and the engagement members 21 and 22 do not come into contact with each other, in consideration of a tolerance.

$$\theta a=\theta c-\gamma \qquad (3)$$

In S205, to which the process in S203 proceeds on affirmative determination, the clutch control unit 60 determines whether or not the target count value θcmd is equal to or greater than the contact position θc. When it is determined that the target count value θcmd is less than the contact position θc (S205: NO), the process proceeds to S210 where the target count value θcmd is set as the contact position θc. When it is determined that the target count value θcmd is equal to or higher than the contact position θc (S205: YES), the process proceeds to S206.

In S206, the clutch control unit 60 determines whether or not the torque-up request flag XCLup is set. When it is determined that the torque-up request flag XCLup is not set (S206: NO), the process proceeds to S207. When it is determined that the torque-up request flag XCLup is set (S206: YES), the process proceeds to S208.

In S207, the clutch control unit 60 determines whether or not the torque-down request flag XCLdown is set. When it is determined that the torque down request flag XCLdown is not set (S207: NO), the process proceeds to S210 where the target count value θcmd is set as the contact position θc.

When it is determined that the torque down request flag XCLdown is set (S207: YES), the process proceeds to S209.

In S208, to which the process proceeds when the torque up request flag XCLup is set, the target count value θcmd is gradually increased such that the engagement torque command becomes larger (see equation (4)). In S209, to which the process proceeds when the torque down request flag XCLdown is set, the target count value θcmd is gradually reduced such that the engagement torque command becomes smaller (see equation (5)). (i−1) in the equation represents the previous value, and (i) represents the current value. Further, d in the equation is a value that is for gradually increasing or decreasing the target count value θcmd. The value d is set according to the computation cycle or the like such that the value d does not exceed the complete meshing position θkam by gradual increase, and such that the value d does not fall below the contact position θc by gradual decrease. The value to be added to the previous value in the formula (4) and the value to be subtracted from the previous value in the formula (5) may be the same value or may be different values.

$$\theta cmd(i) = \theta cmd(I-1) + d \quad (4)$$

$$\theta cmd(i) = \theta cmd(I-1) - d \quad (5)$$

Figure 8:
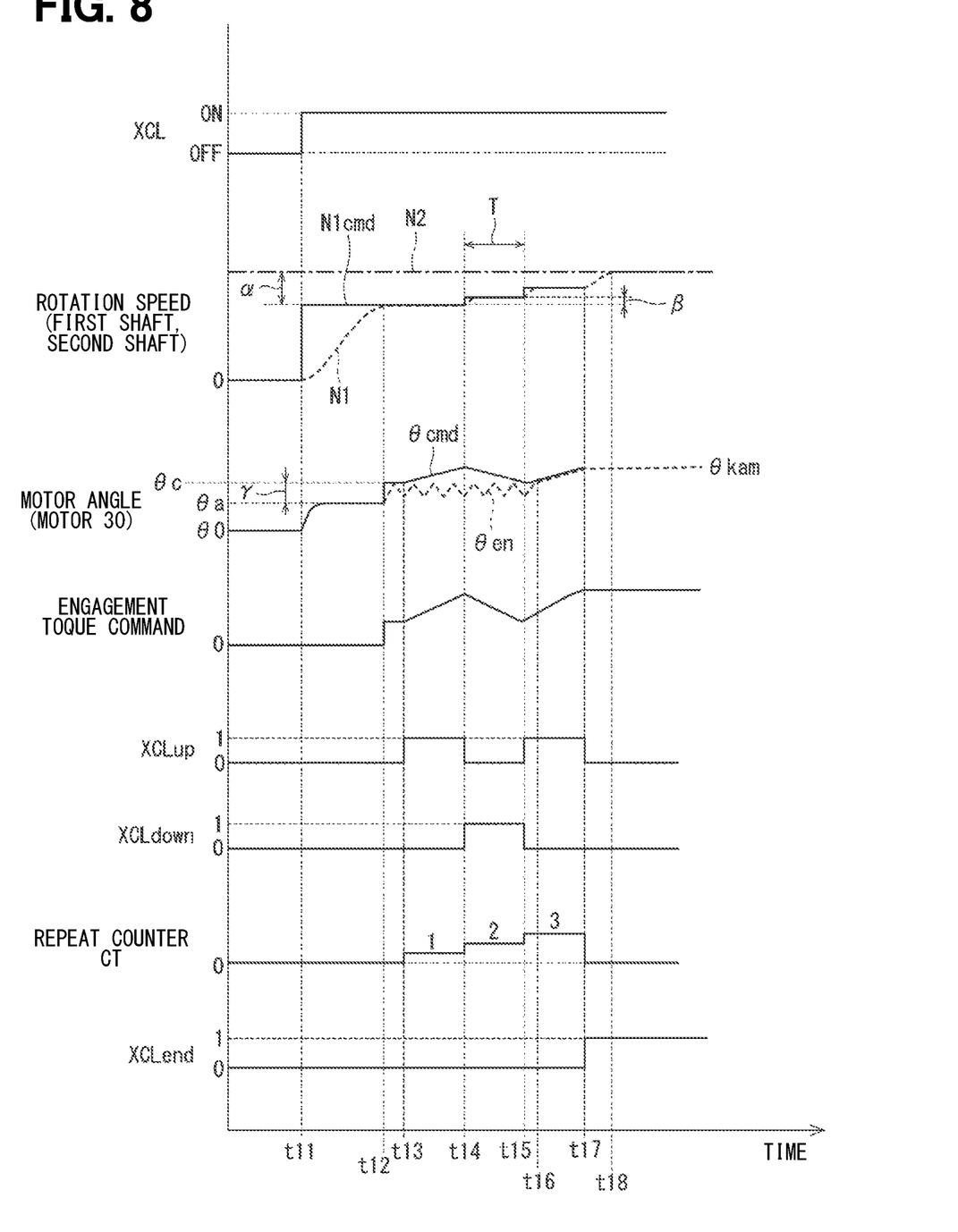
FIG. 8 is a timechart showing a clutch engagement process according to the embodiment.

A clutch engagement process of this embodiment will be described with reference to the timechart of FIG. 6. FIG. 8 shows the clutch engagement command XCL, the rotation speed of the first shaft 201 and the second shaft 202, the motor angle of motor 30, the engagement torque command, the torque up request flag XCLup, the torque down request flag XCLdown, the count value CT of the repeat counter, and the engagement completion flag, from the top part in the horizontal axis that is the common time axis.

Regarding the values related to the rotation of the first shaft 201, the first shaft rotation speed command value N1cmd is shown by a solid line, and the first shaft rotation speed N1 is shown by a broken line. Moreover, the second shaft rotation speed N2 is shown by an alternate long and short dash line. The motor angle of the motor 30 is a value corresponding to the count value of the encoder 31. The target count value θcmd is shown by a solid line, and the encoder count value θen is shown by a broken line. For the sake of explanation, the time scale is appropriately changed and does not necessarily match the actual time scale. The same applies to FIG. 9.

When the clutch engagement command XCL from the high-order control unit 51 is switched from off to on at time t11, the first shaft rotation speed command value N1cmd is set by using the equation (1) to drive the main motor 12. Further, the motor 30 is driven such that the first engagement member 21 is in a predetermined position before coming into contact with the second engagement member 22. When the encoder count value θen reaches the before-engagement position θa, the position is maintained until the time t12 when the first shaft rotation speed N1 becomes the first shaft rotation speed command value N1cmd. The first engagement member 21 is brought closer to the second engagement member 22 before the first shaft rotation speed N1 becomes the first shaft rotation speed command value N1cmd, thereby to enable to enhance the response.

At time t12, when the first shaft rotation speed N1 becomes the first shaft rotation speed command value N1cmd, the target count value θcmd of the motor 30 is set to the contact position θc, thereby to move the first engagement member 21 to a position where the first engagement member 21 comes into contact with the second engagement member 22. At this time, when the phases of the meshing portions 215 and 225 are out of the meshable phase, the first engagement member 21 cannot be engaged with the second engagement member 22 and is repelled. Further, the first shaft rotation speed N1 is different from the second shaft rotation speed N2, and therefore, the phases of the meshing portions 215 and 225 are deviated from each other.

At time t13, when the first clutch engagement process is performed after time t12, since the engagement of the electric clutch device 20 is not completed, the torque-up request flag XCLup is set and the target count value θcmd is gradually increased. As a result, the first engagement member 21 is driven to press onto the second engagement member 22. In FIG. 8, the target count value θcmd is gradually increased from the time t13 subsequent to the time t12. It is noted that, the target count value θcmd may be gradually increased from the time t12.

At time t14, in a case where the computation of the clutch engagement process for the next cycle of FIG. 6 is performed in a state where the meshing portions 215 and 225 are not being meshed, the first shaft rotation speed command value N1cmd is gradually increased. In addition, the torque up request flag XCLup is reset, and the torque down request flag XCLdown is set. Therefore, the target count value θcmd is gradually reduced, and the first engagement member 21 is driven in a direction away from the second engagement member 22.

At time t15, in a case where the computation of the clutch engagement process for the next cycle is performed in a state where the meshing portions 215 and 225 are not being meshed, the first shaft rotation speed command value N1cmd is gradually increased. In addition, the torque up request flag XCLup is set, and the torque down request flag XCLdown is reset. Therefore, the target count value θcmd is gradually increased, and the first engagement member 21 is driven again in a direction to be closer to the second engagement member 22. In this way, when the meshing portions 215 and 225 do not mesh with each other, the first shaft rotation speed command value N1cmd is increased until the count value CT of the repeat counter exceeds the abnormality judgment threshold TH, thereby to cause the first shaft rotation speed N1 to gradually approach the second shaft rotation speed N2. Further, the time period in which the first engagement member 21 is pressed toward the second engagement member 22 and the time period in which the first engagement member 21 is separated from the second engagement member 22 are periodically repeated.

At time t16, when the meshing portions 215 and 225 are in the meshable phase and when the first meshing portion 215 is engaged with the second meshing portion 225, the encoder count value θen is increased to the complete engaged position θkam in a state where the encoder count value θen matches the target count value θcmd.

When the encoder count value θen reaches the complete meshing position Ram at time t17, the meshing portions 215 and 225 are completely meshed with each other. Therefore, the count value CT of the repeat counter is reset, and the complete engagement flag XCLend is set. Further, at time t18, the first shaft rotation speed N1 and the second shaft rotation speed N2 coincide with each other, and the first shaft 201 and the second shaft 202 integrally rotate. After the complete engagement, the engaged state is maintained even when the motor 30 is turned off.

Figure 9:
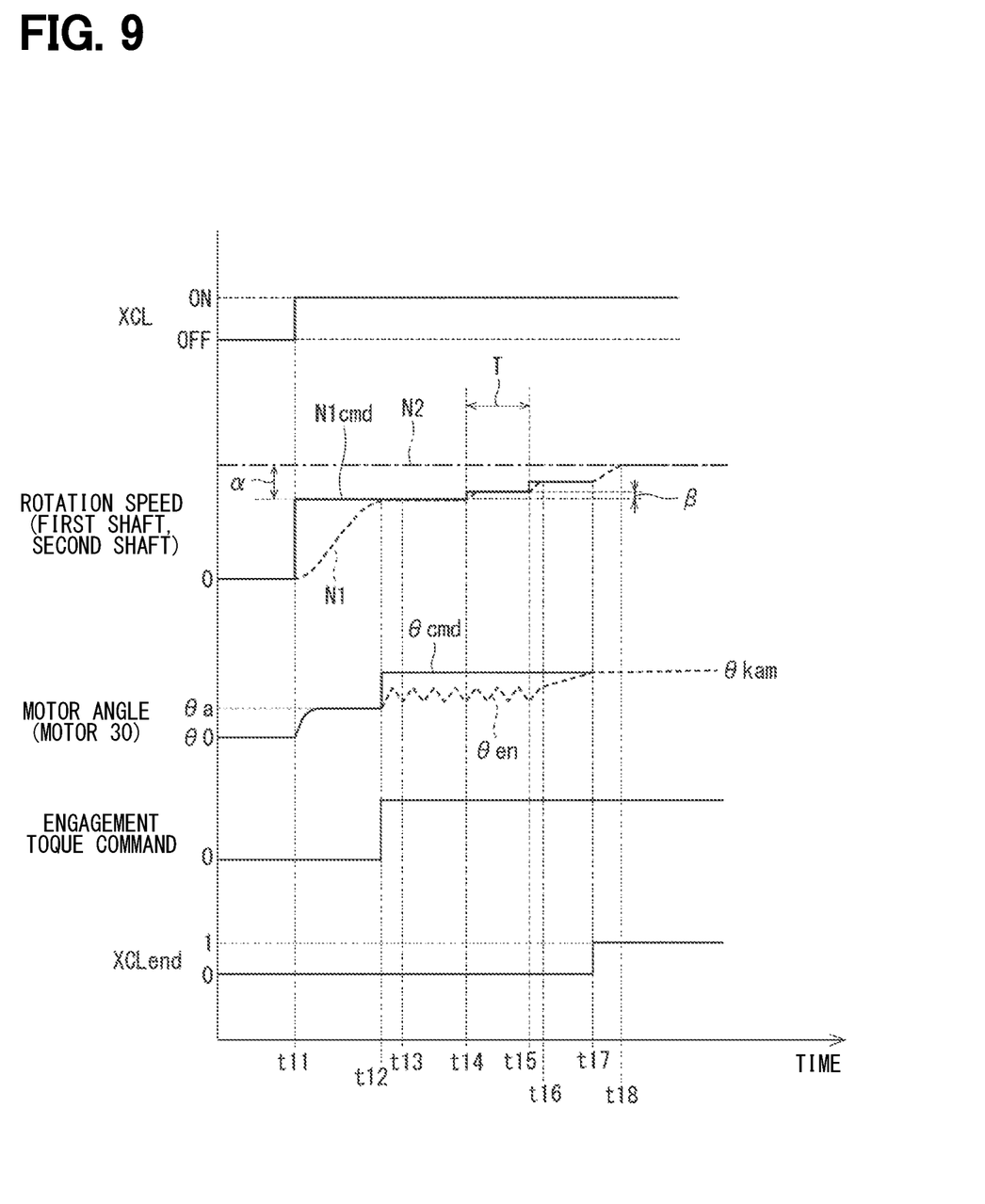
FIG. 9 is a timechart showing the clutch engagement process according to the embodiment.

FIG. 9 shows the clutch engagement command XCL, the rotation speed of the first shaft 201 and the second shaft 202, the motor angle of the motor 30, the engagement torque command, and the engagement completion flag from the upper part. The clutch engagement command XCL, the rotation speed of the first shaft 201 and the second shaft 202, and the engagement completion flag are the same as those in FIG. 8. As shown in FIG. 9, after the time t12 at which the first shaft rotation speed N1 coincides with the first shaft rotation speed command value N1cmd, the target count value θcmd may be set to the complete engagement position θkam without changing the engagement torque command periodically.

The electric clutch device 20 of the present embodiment is of the meshing type, and therefore, the electric clutch device 20 cannot be engaged unless the phases of the meshing portions 215 and 225 are matched at the time of the engagement, and the first engagement member 21 is repelled. Therefore, in order to engage the electric clutch device 20, a phase control to enable the meshing portions 215 and 225 to be in phases that allow meshing and an appropriate clutch pressing force control are required.

Therefore, in the present embodiment, a deviation is set between the rotation speed N1 of the first shaft 201 and the rotation speed N2 of the second shaft 202. Further, when the meshing portions 215 and 225 do not mesh with each other, the pressing force of the engagement members 21 and 22 is increased and decreased, thereby to perform fine adjustment such that the deviation between the values of the rotation speed N1 and N2 becomes small. In this way, the configuration enables to smoothly engage the electric clutch device 20 which is the electric meshing clutch with high response.

As described above, the control device 50 of the present embodiment controls the engagement state of the electric clutch device 20. The electric clutch device 20 includes the first engagement member 21, the second engagement member 22, and the motor 30. The first engagement member 21 includes the first meshing portion 215 and rotates integrally with the first shaft 201. The second engagement member 22 includes a second meshing portion 225 that is configured to mesh with the first meshing portion 215 and rotates integrally with the second shaft 202. The electric clutch device 20 drives the first engagement member 21 by using the pressing member 23 that extends and contracts in response to the drive of the motor 30.

The control device 50 includes the first shaft command computation unit 61 and the drive control unit 65. The first shaft command computation unit 61 computes the first shaft rotation speed command value N1cmd related to the rotation speed N1 of the first shaft 201. The control unit controls driving of the motor.

When the electric clutch device 20 is to be engaged, the first shaft command computation unit 61 sets the first shaft rotation speed command value N1cmd to be smaller than the rotation speed N2 of the second shaft 202. Further, after the rotation speed N1 of the first shaft 201 matches the rotation speed command value N1cmd of the first shaft, the first shaft command computation unit 61 sets the rotation speed command value N1cmd of the first shaft to be gradually closer to the rotation speed N2 of the second shaft 202. In this way, the configuration enables to engage the meshing type electric clutch device 20 appropriately.

According to the present embodiment, the configuration does not use hydraulic pressure to engage the electric clutch device 20. Therefore, the configuration enables to reduce a hydraulic loss or to eliminate the hydraulic loss to be 0 as compared with a configuration in which a clutch thrust is produced by using the hydraulic pressure. In addition, the configuration employs the electric type structure, thereby to enable to perform the control even in a extremely low temperature condition where the hydraulic type structure is not suitable. Therefore, the configuration enables to enlarge the temperature range, in which fuel efficiency can be improved, and to contribute to improvement in fuel efficiency. Furthermore, the electric clutch device 20 is a meshing type dog clutch, and therefore, the pressing force can be reduced to about ⅒ as compared with that of a friction type. Therefore, the configuration enables to downsize the motor 30 that is a clutch actuator.

When the electric clutch device 20 is to be engaged, the drive control unit 65 controls the motor 30, such that, after the rotation speed N1 of the first shaft 201 matches the command value N1cmd of the first shaft rotation speed, the pressing force between the first engagement member 21 and the second engagement member 22 is periodically increased and decreased. In the present embodiment, the configuration increases and decreases the target count value θcmd periodically, thereby to increase and decrease the pressing force is periodically. In this way, the configuration enables to mesh the meshing portions 215 and 225 to each other appropriately.

The control device 50 includes the abnormality determination unit 68. The abnormality determination unit 68 determines that an abnormality has occurred in the electric clutch device 20 in a case where the first meshing portion 215 and the second meshing portion 225 do not mesh with each other, even when the number of times of repeating the increase and decrease in the pressing force becomes larger than an abnormality determination count. In this way, the configuration enables determination of the abnormality of the electric clutch device 20 appropriately. In the present embodiment, the count value CT of the repeat counter corresponds to a "repeat count", and the abnormality determination threshold value TH corresponds to the "abnormality determination count".

The drive control unit 65 drives the first engagement member 21 to the before-engagement position θa, which is before the contact position θc where the first engagement member 21 and the second engagement member 22 come into contact with each other, when the clutch engagement command XCL that is for engaging the electric clutch device 20 is turned on. Further, the drive control unit 65 maintains the first engagement member 21 at the before-engagement position θa until the rotation speed N1 of the first shaft 201 coincides with the first shaft rotation speed command value N1cmd. The first engagement member 21 is brought closer to the second engagement member 22 before the first shaft rotation speed N1 coincides with the first shaft rotation speed command value N1cmd, thereby to enable to enhance the response.

Other Embodiments

In the above embodiment, the clutch control unit includes the first shaft command computation unit and the drive control unit. In another embodiment, each control of the above embodiment may be performed by any control unit of the control device. For example, the first shaft command computation unit may be provided in the MG control unit. Further, the configuration of the control device may be different from that of the above embodiment.

In the above embodiment, the clutch actuator is a DC brushless motor. In other embodiments, a motor other than a DC brushless motor may be used. Further, the clutch actuator may be any actuator as long as the stroke amount is controllable, and may be, for example, a solenoid or the like.

In the above embodiment, the encoder is built in the motor. In other embodiments, the encoder may not be built in the motor. Further, the motor rotation angle sensor that detects the rotation of the motor is not limited to the encoder and another sensor such as resolver may be used.

In the above embodiment, the first engagement member is provided on the side of the main motor, and the second engagement member is provided on the side of the engine. In another embodiment, the first engagement member may be provided to the side of the engine or to the side of the drive shaft side, and the second engagement member may be provided to the side of the MG. In the above embodiment, the electric clutch device is provided between the engine and the main motor. In another embodiment, a clutch provided between the main motor and the drive shaft may be the electric clutch device of the above embodiment.

Further, the configuration of the hybrid system to which the electric clutch device is provided may be different from those of the above-described embodiment. Further, the electric clutch device may be used in an in-vehicle device other than the hybrid system or may be used in a device other than the in-vehicle device. The present disclosure is not limited to the embodiment described above but various modifications may be made within the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A clutch control device for an electric clutch device, the electric clutch device including: a first engagement member that includes a first meshing portion and configured to rotate integrally with a first shaft; a second engagement member that includes a second meshing portion configured to mesh with the first meshing portion and that is configured to rotate integrally with a second shaft; and a clutch actuator, the electric clutch device configured to drive the first engagement member via a pressing member that is configured to extend and contract in response to drive of the clutch actuator, the clutch control device configured to control an engagement state of the electric clutch device, the clutch control device comprising:
   a first shaft command computation unit configured to compute a first shaft rotation speed command value related to a rotation speed of the first shaft; and
   a drive control unit configured to control the drive of the clutch actuator, wherein
   the first shaft command computation unit is configured to, when the electric clutch device is to be engaged,
      set the first shaft rotation speed command value to a value that is smaller than a rotation speed of the second shaft and
      cause the first shaft rotation speed command value to gradually become closer to the rotation speed of the second shaft, after the rotation speed of the first shaft matches the first shaft rotation speed command value.

2. The clutch control device according to claim 1, wherein the drive control unit is configured to, when the electric clutch device is to be engaged, control the clutch actuator to cause the pressing force between the first engagement member and the second engagement member to periodically increase and decrease, after the rotation speed of the first shaft matches the command value of the first shaft rotation speed.

3. The clutch control device according to claim 2, further comprising:
   an abnormality determination unit configured to determine that an abnormality has occurred in the electric clutch device in a case where the first meshing portion and the second meshing portion do not mesh with each other, even when a number of times of repeating increase and decrease in the pressing force becomes larger than an abnormality determination count.

4. The clutch control device according to claim 1, wherein the drive control unit is configured to, when the clutch engagement command for engaging the electric clutch device is turned on,
   drive the first engagement member to a before-engagement position, which is before a contact position at which the first engagement member and the second engagement member come into contact with each other and
   maintain the first engagement member at the before-engagement position until the rotation speed of the first shaft matches the first shaft rotation speed command value.

5. A clutch control device comprising:
   a processor configured to
      compute a first shaft rotation speed command value related to a rotation speed of a first shaft that is configured to rotate integrally with a first meshing portion
      drive a clutch actuator to cause a pressing member to extend and contract to drive the first meshing portion
      when the first meshing portion is to be engaged with a second meshing portion that is configured to rotate integrally with a second shaft, set the first shaft rotation speed command value to a value that is smaller than a rotation speed of the second shaft and
      after the rotation speed of the first shaft matches the first shaft rotation speed command value, cause the first shaft rotation speed command value to gradually become closer to the rotation speed of the second shaft.

* * * * *